(12) United States Patent
Matsumoto et al.

(10) Patent No.: US 9,025,875 B2
(45) Date of Patent: May 5, 2015

(54) PEOPLE COUNTING DEVICE, PEOPLE COUNTING METHOD AND PEOPLE COUNTING PROGRAM

(75) Inventors: Yuichi Matsumoto, Kanagawa (JP);
Sumio Yokomitsu, Tokyo (JP);
Katsunori Waragai, Kanagawa (JP);
Hirofumi Fujii, Kanagawa (JP);
Takayuki Matsukawa, Kanagawa (JP);
Takeshi Fujimatsu, Kanagawa (JP);
Takeshi Watanabe, Kanagawa (JP);
Michio Miwa, Chiba (JP); Masataka Sugiura, Tokyo (JP); Mikio Morioka, Fukuoka (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 117 days.

(21) Appl. No.: 13/885,848

(22) PCT Filed: Nov. 17, 2011

(86) PCT No.: PCT/JP2011/006415
§ 371 (c)(1),
(2), (4) Date: May 16, 2013

(87) PCT Pub. No.: WO2012/066785
PCT Pub. Date: May 24, 2012

(65) Prior Publication Data
US 2013/0230245 A1 Sep. 5, 2013

(30) Foreign Application Priority Data

Nov. 18, 2010 (JP) .................. 2010-258037

(51) Int. Cl.
*G06K 9/34* (2006.01)
*G06T 7/00* (2006.01)
*G06K 9/00* (2006.01)

(52) U.S. Cl.
CPC .......... *G06T 7/0081* (2013.01); *G06K 9/00369* (2013.01); *G06K 9/00778* (2013.01)

(58) Field of Classification Search
CPC .............. G06K 9/0025; G06K 9/0028; G06K 9/00255; G06K 9/00261; G06K 9/00362; G06K 9/00771; G06K 9/00778; G06K 9/324; G06T 7/2093; G06T 2207/30196; G06T 2207/30232; G06M 11/00; G07C 9/00; G01J 5/0022; G01J 5/0025; Y10S 250/01
See application file for complete search history.

(56) References Cited

U.S. PATENT DOCUMENTS 5,121,201 A * 6/1992 Seki .............................. 348/143
7,688,349 B2 * 3/2010 Flickner et al. ............... 348/150

(Continued)

FOREIGN PATENT DOCUMENTS

| JP | 2005-025328 | 1/2005 |
| JP | 2005-115932 | 4/2005 |
| JP | 2009-211274 | 9/2009 |

OTHER PUBLICATIONS

Navneet Dalal, "Finding People in Images and Videos", PhD Thesis, Institut National Polytechnique de Grenoble/INRIA Grenoble, Grenoble, Jul. 2006.

(Continued)

*Primary Examiner* — Jose Couso
(74) *Attorney, Agent, or Firm* — Greenblum & Bernstein, P.L.C.

(57) ABSTRACT

A people counting device includes: a person presence region extraction unit which extracts a region in which a person is present by performing person detection in relation to an input image; a person presence state estimation unit which estimates a person presence state from an extraction result; a portion detector selection unit which selects a type of portion detector to be used for people count measurement based on the estimation result, and outputs portion detector information. The people counting device further includes: a portion detection process unit which performs a portion detection process for detecting a portion of a person based on the portion detector information; and a people counting unit which obtains a number of people within the input image from a portion detection process result.

18 Claims, 12 Drawing Sheets

(56) References Cited

U.S. PATENT DOCUMENTS

| | | | |
|---|---|---|---|
| 8,116,564 B2* | 2/2012 | Kilambi et al. | 382/174 |
| 8,224,026 B2* | 7/2012 | Golan et al. | 382/103 |
| 8,284,991 B2* | 10/2012 | Tojo et al. | 382/103 |
| 8,861,784 B2* | 10/2014 | Tojo | 382/103 |
| 2009/0220123 A1 | 9/2009 | Tojo et al. | |

OTHER PUBLICATIONS

Bo Wu et al., "Detection and Tracking of Multiple, Partially Occluded Humans by Bayesian Combination of Edgelet based Part Detectors", International Journal of Computer Vision, 75(2), 2007, pp. 247-266, Nov. 2007.

Kosuke Sato, "Image Based Security Sensing Systems", System/Seigyo/Joho, vol. 42, No. 3, Mar. 15, 1998, pp. 150-155.

* cited by examiner

US 9,025,875 B2

PEOPLE COUNTING DEVICE, PEOPLE COUNTING METHOD AND PEOPLE COUNTING PROGRAM

TECHNICAL FIELD

The present invention relates to a people counting device, a people counting method and a people counting program to perform people counting in relation to an image imaged from a surveillance camera or the like using person detection technology.

BACKGROUND ART

In a surveillance camera system of recent years, person detection technology is employed in order to perform automatic detection of an intruder to a shop or the like and automatic counting or the like of a number of visitors. As a person detection technology of the related art, for example, those disclosed in Patent Document 1 or Non-Patent Documents 1 and 2 are known.

In the related art, Patent Document 1 discloses a method of performing a matching process between an input image that is imaged by a surveillance camera or the like and a background image database, and estimates the number of people according to the position and number of pixels detected by difference detection. In the related art, Non-Patent Document 1 discloses a method of extracting a Histogram of Oriented Gradient (HOG) feature value from a large number of detection target samples (images containing the whole body of a person) and non-detection target samples (images not containing the whole body of a person) in advance and modeling the boundary lines of each of the sample groups in the feature space using an Support Vector Machine (SVM), thereby realizing person detection technology from within static images. In the related art, Non-Patent Document 2 discloses a method of configuring a portion detector which detects a portion of a person, using an Edgelet feature value and a boosting algorithm, and combining the output results of each of the portion detectors into one by performing maximum a posteriori probability estimation.

The person detection from within a static image performed in Non-Patent Documents 1 and 2 is generally performed as follows. First, since the size and the position of a person within the input image imaged by a surveillance camera or the like is not fixed, the input image is converted into a pyramid image by repeatedly performing a scaling process of a resize process or the like in relation to the input image. Subsequently, an image window of a predetermined size is extracted from each of the scaling images which configure the pyramid image at a predetermined interval, and the person detection determination process is performed using threshold value determination of a score on the basis of a predetermined value of a feature value within each of the image windows.

Since the person detector is configured to achieve a robust (strong) detection function in relation to various shape variations of a non-rigid body such as a person, when the person detection result is displayed within the input image as a person detection candidate rectangular frame, as in FIG. 11, a plurality of person detection candidate rectangular frames 110a are output in the periphery of a person (hereinafter referred to as the person detection result positional shift issue). Finally, by performing a combination process on the person detection candidate rectangular frames 110a to determine whether they are of the same group on the basis of the property information of each of the rectangles (the center location, the size, the score and the like), a final combined result 111 is displayed as the person detection result (refer to FIG. 5.1 of Non-Patent Document 1). In a case in which people counting or the like is performed, the number of the final combined results 111 of the rectangles is counted as the number of people.

RELATED ART DOCUMENTS

Patent Documents

Patent Document 1: JP-A-2005-25328

Non-Patent Documents

Non-Patent Document 1: Navneet Dalal, "Finding People in Images and Videos", PhD Thesis, Institut National Polytechnique de Grenoble/INRIA Grenoble, Grenoble, July 2006.

Non-Patent Document 2: Bo Wu and Ram Nevatia, "Detection and Tracking of Multiple, Partially Occluded Humans by Bayesian Combination of Edgelet based Part Detectors", International Journal of Computer Vision, 75(2): 247-266, 2007.

SUMMARY OF THE INVENTION

Problem to be Solved by the Invention

However, the following problems are present in the person detection technology of the related art described above.

First, in the technology disclosed in Patent Document 1, since the matching process is performed on the basis of difference information between an input image and a background image database, in a case in which sudden environmental fluctuations in lighting, shadows and the like occur and an appropriate background image cannot be selected, the people counting precision is degraded.

In the technology disclosed in Non-Patent Document 1, since a whole body detector is used, the influence of the person detection result positional shift issue is received, in particular. For example, as shown in FIG. 12(a), in a case in which a plurality of persons are close to one another, each of the person detection candidate rectangular frames relating to persons lined up to the left and right of one another are close to one another, the plurality of persons is determined to be the same group in the subsequent combination process of the person detection candidate rectangular frames, and therefore, persons to the left and right of one another may not be detected separately. In addition, as shown in FIG. 12(b), since the person detection precision in relation to posterior persons with occlusion deteriorates, the number of the person detection candidate rectangular frames is small in comparison with that of the person detection candidate rectangular frames of anterior persons and persons to the front and rear of one another may not be detected separately.

In the technology disclosed in Non-Patent Document 2, since a portion detector is used, the influence of the person detection result positional shift issue is alleviated. This is because, in a case in which the human body is viewed portion-by-portion in detail, a portion of the human body may be considered to be a non-rigid body that is closer to a rigid body. However, in the technology disclosed in Non-Patent Document 2, since it is necessary to perform the person detection process always using all of the portion detectors prepared in advance in relation to all of the image windows extracted from the input image in relation to the occlusion of any situation, this may not be considered to be performing an appropriate person detection process due to the possibility of an increase in erroneous detections due to even using portion detectors which are not inherently necessary, and from a viewpoint of increasing the processing speed.

For example, in FIG. 13, when an upper body detector 134 and a lower body detector 135 are always used in relation to an input image 130, it is possible to detect a person with occlusion on the lower body 131, and a person with occlusion on the upper body 132. However, inherently, in relation to the person with occlusion on the lower body 131 and the person with occlusion on the upper body 132, it is sufficient to just perform the person detection process of only the upper body detector 134 or the lower body detector 135, respectively, and the process speed is increased by further using the lower body detector 135 and the upper body detector 134. Furthermore, in general, a portion detector of the upper body, the lower body or the like has more erroneous detections in comparison with a whole body detector (refer to FIG. 7.1 of Non-Patent Document 1), and has a further increased risk of generating an erroneous detection (for example, an erroneous detection such as detecting a tree 133) due to always using the upper body detector 134 and the lower body detector 135 in relation to the input image 130.

The present invention has been made in consideration of the circumstances, and an object thereof is to provide a people counting device, a people counting method and a people counting program which can perform person detection with more precision and speed, even in a case in which, in the input image, a plurality of persons are close to one another or occlusion occurs due to a plurality of persons.

Means for Solving the Problem

A people counting device of the present invention includes: a person presence region extraction means for extracting a region in which a person is present by performing person detection in relation to an input image; a person presence state estimation means for estimating a person presence state from an extraction result of the person presence region extraction means; a portion detector selection means for selecting a type of portion detector to be used for people count measurement based on an estimation result of the person presence state estimation means, and outputting portion detector information; a portion detection process means for performing a portion detection process for detecting a portion of a person by using the portion detection process based on the portion detector information output from the portion detector selection means; and a people counting means for obtaining a number of people within the input image from a portion detection process result of the portion detection process means.

According to the above configuration, it is possible to select an optimal detector from a plurality of detectors to perform the people counting according to the situation, and the precision of the people counting increases. Accordingly, it is possible to perform person detection with more precision and speed, even in a case in which, in the input image, a plurality of persons are close to one another or occlusion occurs due to a plurality of persons.

In the above configuration, the person presence region extraction means outputs rectangle information as the extraction result, and the person presence state estimation means estimates the person presence state according to an aspect ratio, or lengths of a height and a width, of the rectangle information extracted by the person presence region extraction means.

According to the above configuration, it is possible to estimate the person presence state with more certainty, and it is possible to perform the people counting with high precision.

In the above configuration, the portion detector selection means selects the portion detector which performs the portion detection in a case in which the estimation result of the person presence state estimation means determines that persons are overlapping one another.

According to the above configuration, it is possible to perform the person counting with high precision, even in a case in which the persons are overlapping one another.

In the above configuration, the portion detector selection means selects at least one of an upper body detector, a lower body detector, a right-side body detector and a left-side body detector as the portion detector.

According to the above configuration, it is possible to perform the people counting with high precision, even in a case in which the persons are overlapping one another by selecting at least one of the four detectors.

In the above configuration, the person presence state estimation means determines that the persons are overlapping one another in a vertical direction in a case in which the rectangle information extracted by the person presence region extraction means is not long in a horizontal direction and is long in the vertical direction in comparison with a size of a person, and the portion detector selection means selects the upper body detector in a case in which the person presence state estimation means determines that the persons are overlapping one another in the vertical direction.

According to the above configuration, it is possible to perform the people counting with high precision, even in a case in which the persons are overlapping one another in the vertical direction.

In the above configuration, the person presence state estimation means determines that the persons are overlapping one another in the horizontal direction in a case in which the rectangle information is long in the horizontal direction and not long in the vertical direction in comparison with the size of a person, and the portion detector selection means selects the right-side body detector and the left-side body detector in a case in which the person presence state estimation means determines that the persons are overlapping one another in the horizontal direction.

According to the above configuration, it is possible to perform the people counting with high precision, even in a case in which the persons are overlapping one another in the horizontal direction.

In the above configuration, the person presence state estimation means determines that the persons are overlapping one another over a wide range in a case in which the rectangle information is long in the horizontal direction and the vertical direction in comparison with the size of a person, and the portion detector selection means selects the upper body detector, the lower body detector, the right-side body detector and the left-side body detector in a case in which the person presence state estimation means determines that the persons are overlapping one another over a wide range.

According to the above configuration, it is possible to perform the people counting with high precision, even in a case in which the persons are overlapping one another over a wide range.

A people counting method of the present invention includes: a step of extracting a region in which a person is present by performing person detection in relation to an input image; a step of estimating a person presence state from a result in which a region where a person is present is extracted;

a step of selecting a type of portion detector to be used for people count measurement based on a result in which a person presence state is estimated, and outputting portion detector information; a step of performing a portion detection process for detecting a portion of a person by using the portion detection process based on the portion detector information of the selected portion detector; and a step of obtaining a number of people within the input image from a detection process result.

According to the above method, it is possible to select an optimal detector from a plurality of detectors to perform the people counting according to the situation, and the precision of the people counting increases. Accordingly, it is possible to perform person detection with more precision and speed, even in a case in which, in the input image, a plurality of persons are close to one another or occlusion occurs due to a plurality of persons.

The people counting program of the present invention is a program to cause a computer to execute each step of the above people counting method.

According to the above program, it is possible to select an optimal detector from a plurality of detectors to perform the people counting according to the situation, and the precision of the people counting increases. Accordingly, it is possible to perform person detection with more precision and speed, even in a case in which, in the input image, a plurality of persons are close to one another or occlusion occurs due to a plurality of persons.

Advantages of the Invention

According to the present invention, it is possible to provide a people counting device, a people counting method and a people counting program which have the effect of being able to perform person detection with more precision and speed, even in a case in which, in the input image, a plurality of persons are close to one another or occlusion occurs due to a plurality of persons.

MODE FOR CARRYING OUT THE INVENTION

Hereafter, detailed description will be given of favorable embodiments for realizing the present invention with reference to the drawings.

Figure 1:
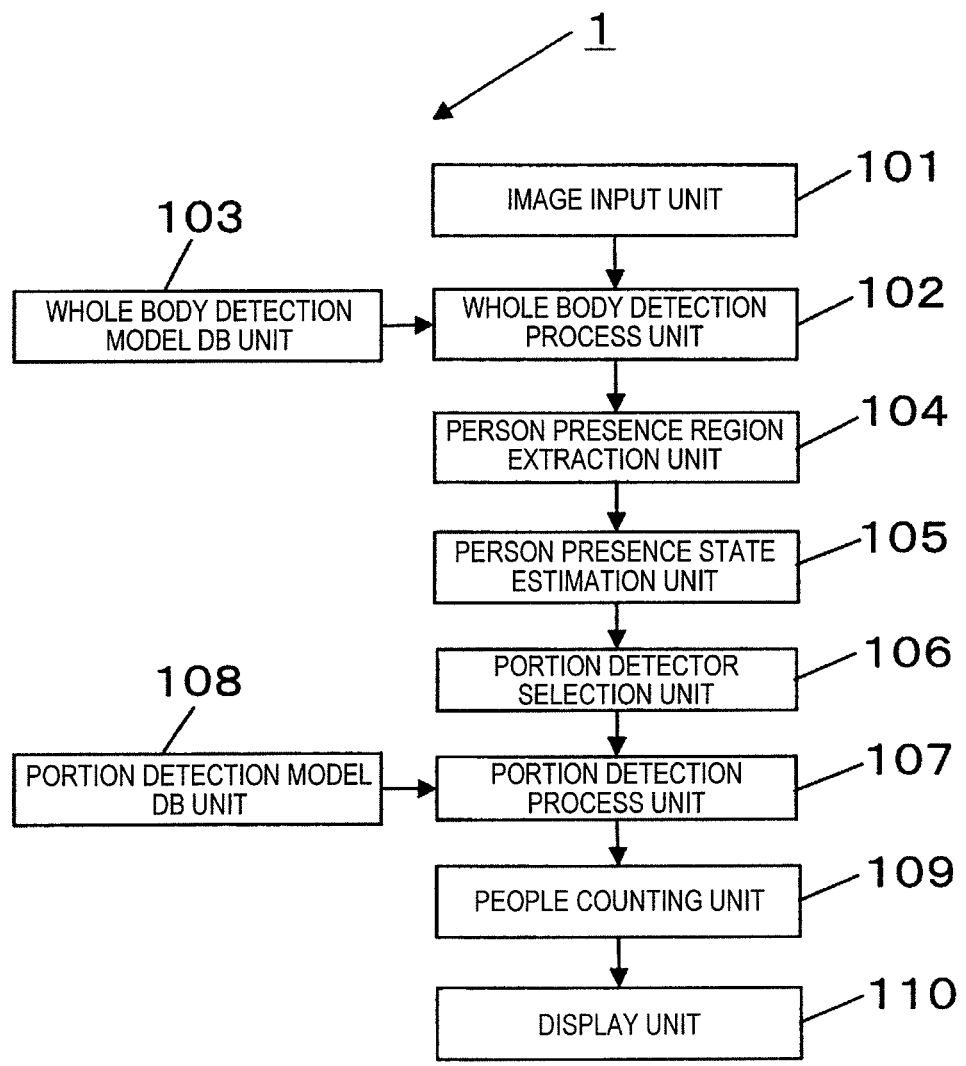
FIG. 1 is a block diagram showing the schematic configuration of the people counting device according to an embodiment of the present invention.

FIG. 1 is a block diagram showing the schematic configuration of the people counting device according to an embodiment of the present invention. In FIG. 1, a people counting device 1 of the present embodiment includes an image input unit 101, a whole body detection process unit 102, a whole body detection model database unit (hereinafter denoted as the whole body detection model DB unit) 103, a person presence region extraction unit 104, a person presence state estimation unit 105, a portion detector selection unit 106, a portion detection process unit 107, a portion detection model database unit (hereinafter denoted as the portion detection model DB unit) 108, a people counting unit 109 and a display unit 110.

Figure 2A:
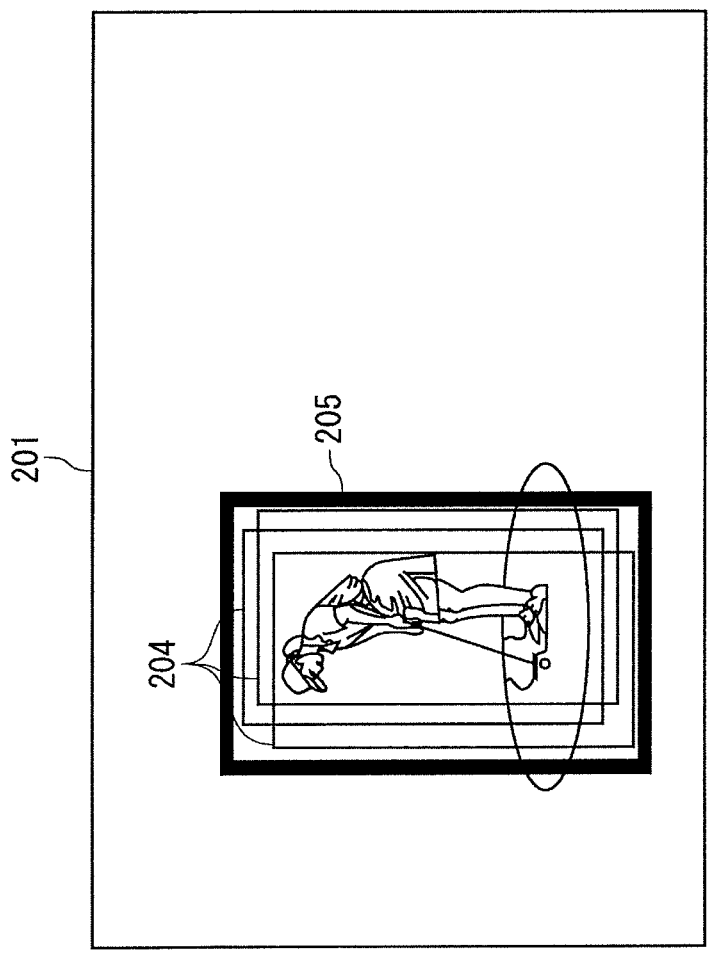
FIGS. 2(a) and 2(b) are views showing an example of the input image and a pyramid image generated from the input image in the people counting device of FIG. 1.
Figure 2B:
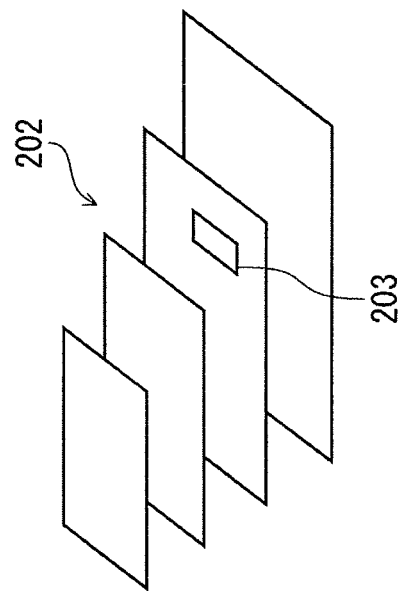

Hereinafter, detailed description will be given of each configuration element of the people counting device 1 shown in FIG. 1. The image input unit 101 performs the input and output of the image information imaged by the surveillance camera or the like (not shown), and performs maintenance of the image information. The whole body detection process unit 102 converts an input image into a pyramid image by repeatedly performing the scaling process of a resize process or the like in relation to the input image, with the image output from the image input unit 101 as the input. FIG. 2 is a view showing an example of the input image and a pyramid image generated from the input image. FIG. 2(a) represents an input image 201, and FIG. 2(b) represents a pyramid image 202. The whole body detection process unit 102 extracts an image window 203 of a predetermined size at a predetermined interval from each of the scaling images which configure the pyramid image 202 generated from the input image 201, and performs a whole body detection process in relation to each of the image windows 203. The whole body detection process is performed based on a score value which represents the likeness of a whole-body of a person within the image window 203, and determines that the whole body of a person is contained in the image window 203 in which a score value is calculated to be a predetermined score threshold value A, which is set in advance, or higher. The whole body detection process unit 102 finally outputs two dimensional positional information obtained when performing inverse scaling conversion on the two dimensional positional information of the image window 203 determined to contain a whole body from the respective scaling images in relation to the input image 201 prior to being subjected to the scaling process, and the score value of the image window 203.

The whole body detection model DB unit 103 sets the value of the feature value extracted from the image window 203 as the input, and is a database accumulated in which is at least one or more items of model information in which a score value to determine whether or not a whole body is contained within the image window 203 is output. The whole body detection process unit 102 performs the whole body detection process in relation to the image window 203 based on the model information.

The model information in the whole body detection model DB unit 103 can be configured by extracting a feature value from a large number of detection target samples (images containing the whole body of a person) and non-detection target samples (images not containing the whole body of a person) in advance, and using a typical statistical learning method such as an Support Vector Machine (SVM) or a boosting algorithm in relation to the boundary lines of each of the sample groups in the feature space. As a result, model information in which the score value increases in a case in which the whole body of a person is contained within the image window 203 and, conversely, the score value decreases in a case in which the whole body of a person is not contained within the image window 203 is accumulated in the whole body detection model DB unit 103.

Figure 3:
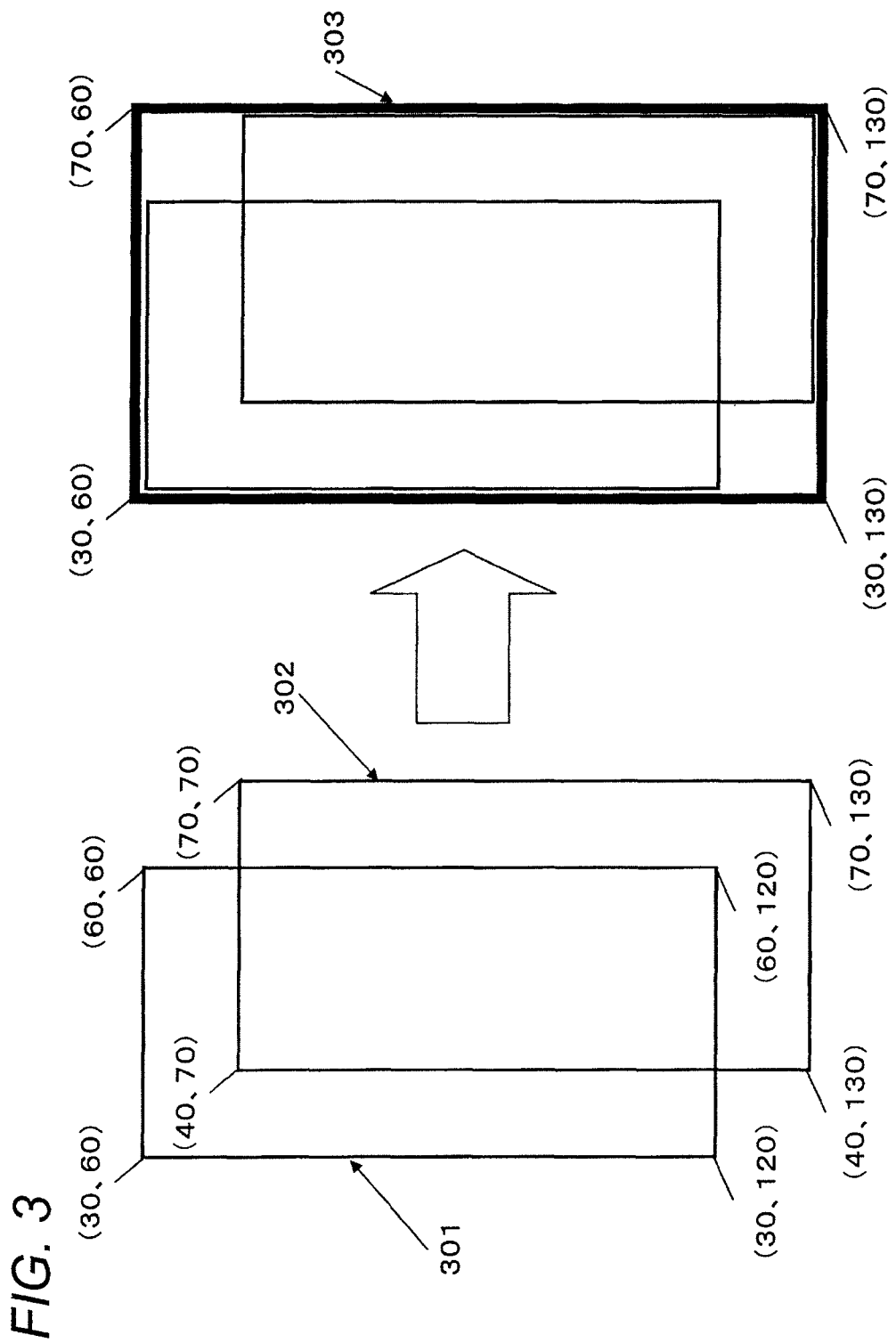
FIG. 3 is a view showing an example of the setting of the person presence region, which is a union region of the whole body detection candidate frames, in the people counting device of FIG. 1.

The person presence region extraction unit 104, from among a plurality of whole body detection candidate frames 204 (refer to FIG. 2(a)) which are the output results of the whole body detection process unit 102, for example, classifies the whole body detection candidate frames 204 in which the distance between the center positions is within a predetermined distance threshold value B into the same group, and for each of the groups, and sets a person presence region 205 which is the union region of the whole body detection candidate frames 204. Furthermore, when the two dimensional positional information of the plurality of the whole body detection candidate frames 204 in the input image is represented by four sets of XY coordinates (X, Y) of each of the rectangles, the person presence region 205 calculates for each of the groups, the X_MIN in which the X coordinate is at a minimum, the Y_MIN in which the Y coordinate is at a minimum, the X_MAX in which the X coordinate is at a maximum and the Y_MAX in which the Y coordinate is at a maximum, and may be set according to a region encompassed by the following four coordinates (X_MIN, Y_MIN), (X_MIN, Y_MAX), (X_MAX, Y_MIN) and (X_MAX, Y_MAX). FIG. 3 is a view showing an example of the setting of a person presence region 303, which is a union region of the whole body detection candidate frames 301 and 302.

The person presence state estimation unit 105 estimates the person presence state within the person presence region 205 as one of the four patterns (pattern 1) one person is present, (pattern 2) persons are lined up in the vertical direction, (pattern 3) persons are lined up in the horizontal direction and (pattern 4) other, based on the threshold value determination result according to the vertical and the horizontal size information, respectively, of the person presence region 205 output from the person presence region extraction unit 104.

Figure 4:
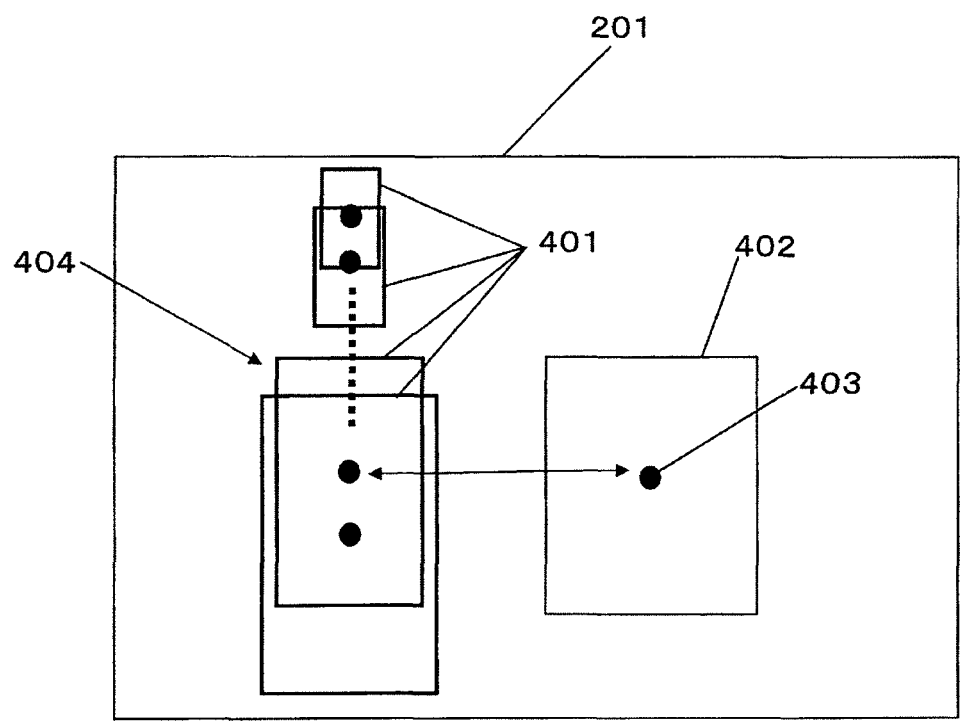
FIG. 4 is a view showing an example of how to obtain a standard person size, in the people counting device of FIG. 1.

The threshold value determination of the person presence region 205 is performed by comparison with a standard person size. As a method of how to obtain the standard person size, for example, the standard person size may be set from the installation position of the camera or the like in advance. In addition, as another method, since there is a case in which the standard person size varies according to the position on the screen according to the installation angle of the camera, in this case, it is possible to obtain a standard person size by setting the height information of a person possible to detect in arbitrary positions on the input image 201 in advance. For example, in a case in which the size of a person changes in the Y axis direction on the image, a reference image window group 401 that represents the standard person size in each position within the screen as shown in FIG. 4 is set on the input image 201, and a rectangle 404 in which the distance between the Y coordinate of a center position 403 of a person presence region 402 and the Y coordinate of the center position within the reference image window group 401 is closest is adopted as the standard person size.

Figure 5:
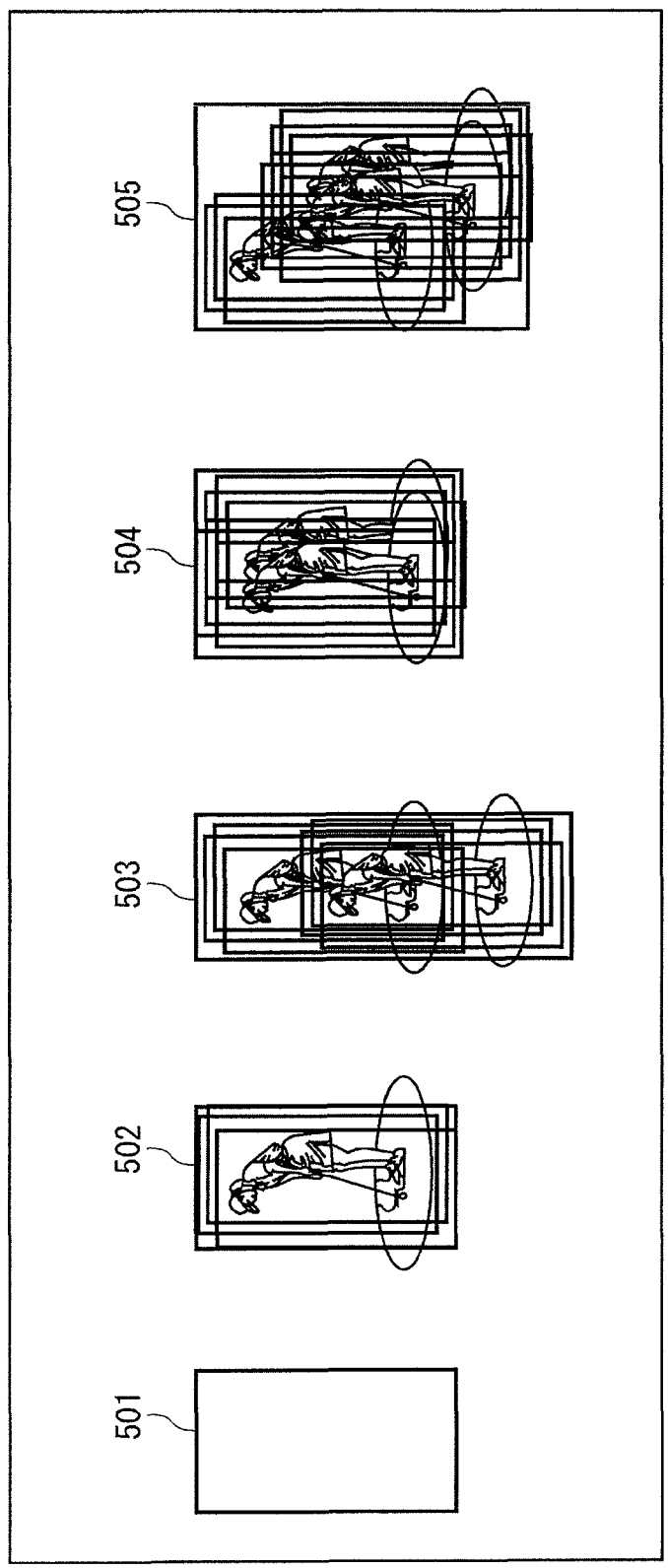
FIG. 5 is a view showing a state in which, in the people counting device of FIG. 1, the standard person size is a rectangle, the differences of the respective vertical and horizontal sizes of the person presence regions and the rectangles are compared with a threshold value, and categorized into four patterns.

FIG. 5 is a view in which the standard person size is a rectangle 501, the differences of the respective vertical and horizontal sizes of the person presence regions 402 and the rectangles 501 are compared with a threshold value, and categorized into the above four patterns. In a case in which, in the person presence region, the horizontal size difference is smaller than the horizontal size threshold value C_h and the vertical size difference is smaller than the vertical size threshold value C_v, as in 502, the person presence state in the person presence region is estimated to be the above (pattern 1) by the person presence state estimation unit 105. In addition, in a case in which, in the person presence region, the horizontal size difference is smaller than the horizontal size threshold value C_h and the vertical size difference is greater than the vertical size threshold value C_v, as in 503, the person presence state is estimated to be (pattern 2). In addition, in a case in which, in the person presence region, the horizontal size difference is greater than the horizontal size threshold value C_h and the vertical size difference is smaller than the vertical size threshold value C_v, as in 504, the person presence state is estimated to be (pattern 3), and in a case in which, in the person presence region, the respective vertical and horizontal size differences correspond to none of the above, as in 505, the person presence state is estimated to be (pattern 4).

In the portion detector selection unit 106, the portion detection process to be used in the following process is selected according to the four patterns estimated by the person presence state estimation unit 105. Specifically, the portion detection process of one of the four patterns is selected in a case in which (pattern 1) there is one person present, the portion detection process is not performed, in a case in which (pattern 2) persons are lined up in the vertical direction, the upper body detection process is performed, in a case in which (pattern 3) persons are lined up in the horizontal direction, the half body detection process (the right-side body and the left-side body) is performed, and in other cases (pattern 4) the upper body detection process and the half body detection process (the right-side body and the left-side body) are performed together.

Figure 6:
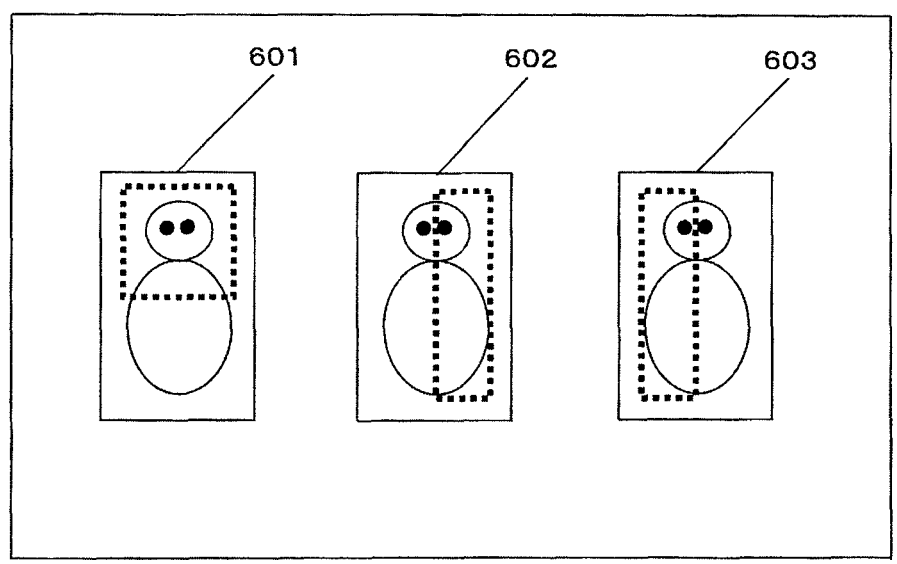
FIG. 6 is a view showing an outline of the portion detection process in the people counting device of FIG. 1.

FIG. 6 is a view showing an outline of the portion detection process, and the upper body detector, the right-side body detector and the left-side body detector detect the shape of the portion of the persons within the rectangular regions 601, 602 and 603 which are respectively represented with dotted lines in FIG. 6. In the portion detection process unit 107, the person presence region 205 extracted by the person presence region extraction unit 104 is set as the input, and the input image 201 is converted into a pyramid image by repeatedly performing a scaling process of a resize process or the like in relation to the input image 201. Subsequently, in the same manner as the whole body detection process unit 102, an image window of a predetermined size is extracted from each of the scaling images in the pyramid image at a predetermined interval, and the portion detection process is performed by using the portion detector information output from the portion detector selection unit 106 in relation to each of the image windows. The portion detection process is a process which is performed based on a score value which represents the likeness of a portion of a person within the image window, and determines that the portion of a person is contained in the image window in which a score value is calculated to be a predetermined score threshold value F, which is set in advance, or higher. The portion detection process unit 107 finally outputs two dimensional positional information obtained when performing inverse scaling conversion on the two dimensional positional information of the image window determined to contain a portion of a person from the respective scaling images in relation to the input image 201 prior to being subjected to the scaling process, and outputs the score value of the image window.

The portion detection model DB unit 108 sets the value of the feature value extracted from the image window as the input, and is a database accumulated in which is at least one or more items of model information in which a score value to determine whether or not a portion of a person is contained within the image window is output. The portion detection process is performed in relation to the image window in the portion detection process unit 107 based on the model information.

The model information in the portion detection model DB unit 108 can be configured by extracting a feature value from a large number of detection target samples (images containing a portion of a person) and non-detection target samples (images not containing a portion of a person) in advance, and using a typical statistical learning method such as an Support Vector Machine (SVM) or a boosting algorithm in relation to the boundary lines of each of the sample groups in the feature space. As a result, model information in which the score value increases in a case in which a portion of a person is contained within the image window and, conversely, the score value decreases in a case in which a portion of a person is not contained within the image window is accumulated in the portion detection model DB unit 108.

The people counting unit 109 performs the people counting according to the estimation result of the person presence state estimation unit 105. Specifically, the operations of each of the patterns will be described below.

(Pattern 1) Case

Using the two dimensional positional information of the plurality of image windows determined to contain the whole body of a person on the input image 201 and the score value of the respective image windows, the number of combined detection frames obtained by performing the combination process on the detection frame candidates is counted as the detected number of people.

(Pattern 2) Case

Figure 7:
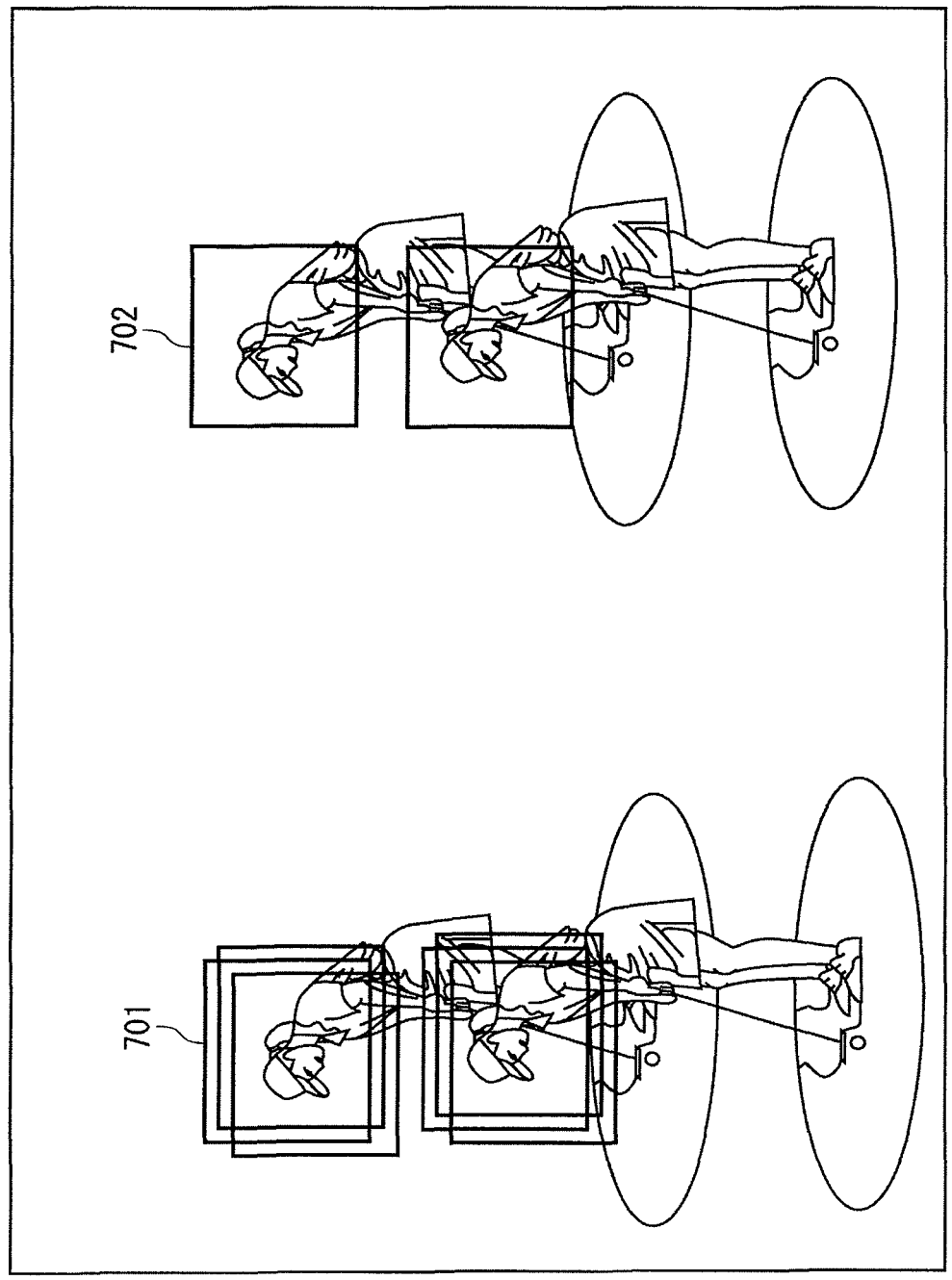
FIG. 7 is a view showing an example of the creation of a combined detection frame group in the people counting device of FIG. 1.

Using the two dimensional positional information of the plurality of image windows determined to contain the upper body of a person on the input image 201 and the score value of the respective image windows, the number of combined detection frames obtained by performing the combination process on the detection frame candidates is counted as the detected number of people. FIG. 7 is a view showing an example of the creation of a combined detection frame group 702. As shown in FIG. 7, it is possible to combine the detection frame candidates and to create the combined detection frame group 702 by determining detection candidate frame groups 701, in which the score difference between each of the detection candidate frame groups 701 is within a predetermined score threshold value G and the distance between the center positions is a predetermined distance threshold value H or less, to be the same group.

(Pattern 3) Case

Using the two dimensional positional information of the plurality of image windows determined to contain a half of a body of a person on the input image 201 and the score value of the respective image windows, the result of further performing combination of the combined detection frames in relation to the combined detection frames subjected to the combination process of the detection frame candidates by further using the respective detectors of the right-side body and the left-side body is counted as the number of people.

Figure 8:
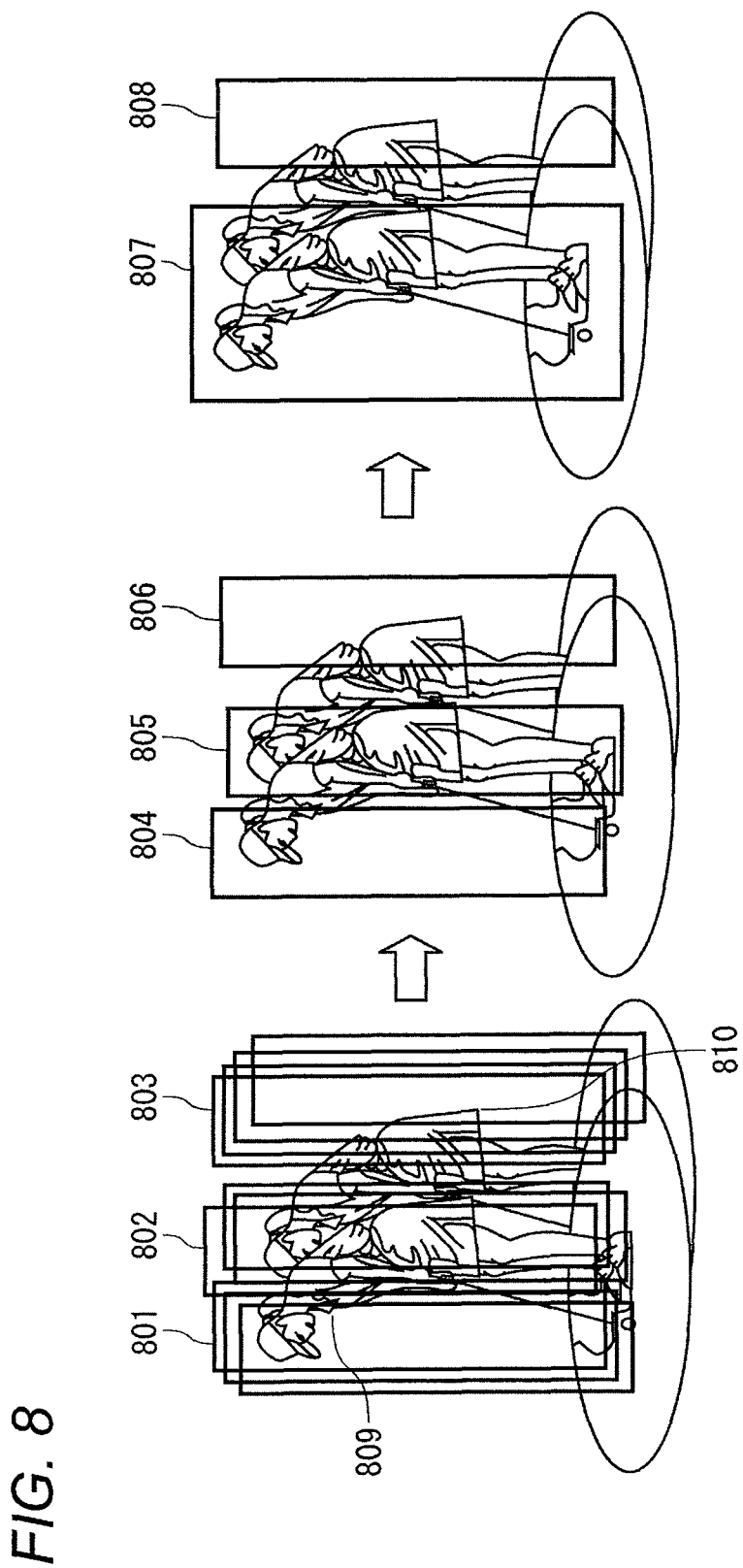
FIG. 8 is a view showing an example of the creation process of the combined detection frame in the people counting device of FIG. 1.

FIG. 8 is a view showing an example of the creation process of the combined detection frames in pattern 3. As shown in FIG. 8, the detection frame candidates are combined and the combined detection frame groups 804, 805 and 806 are created by determining detection candidate frame groups 801, 802 and 803, in which the score difference between each of the detection candidate frame groups 801, 802 and 803 is within a predetermined score threshold value G and the distance between the center positions is a predetermined distance threshold value H, or less to be the same group, and by calculating the average position and the average size of the detection candidate frames within the same group. Subsequently, in a case in which it is possible, the detection candidate frames of different portion detectors are combined. For example, when the distance between the center position of the left-side body combined detection frame 804 of the person 809 and the center position of the right-side body combined detection frame 805 of the person 809 is a predetermined distance threshold value I or less and the X coordinate of the center position of the right-side body combined detection frame 805 is greater than the X coordinate of the center position of the left-side body combined detection frame 804, the left-side body combined detection frame 804 and the right-side body combined detection frame 805 are considered to be the detection results in relation to the left-side body and the right-side body of the same person, and the union region 807 of each of the combined detection frames 804 and 805 is set as the final combined detection frame in relation to the person 809. In addition, in relation to the right-side body combined detection frame 806 of the person 810, since there are no detection candidate frames of the left-side body detector in a region which is within the predetermined distance threshold value I from the center position of the right-side body combined detection frame 806 and is smaller than the X coordinate of the center position of the right-side body combined detection frame 806, it is estimated that occlusion or the like is occurring in the left portion of the body of the person 810, and the right-side body combined detection frame 806 is set as the final combined detection frame 808 in relation to the person 810.

(Pattern 4) Case

Using the two dimensional positional information of the plurality of image windows determined to contain an upper body and a half of a body of a person on the input image 201 and the score value of the respective image windows, the result of further performing combination of the combined detection frames in relation to the combined detection frames subjected to the combination process of the detection frame candidates by further using the respective detectors of the upper body, the right-side body and the left-side body is counted as the number of people. Furthermore, it is possible to create the union region using the same method as in FIG. 3, and it is possible to perform the process using the same method as when the upper body detector is used at the same time in pattern 4.

Figure 9:
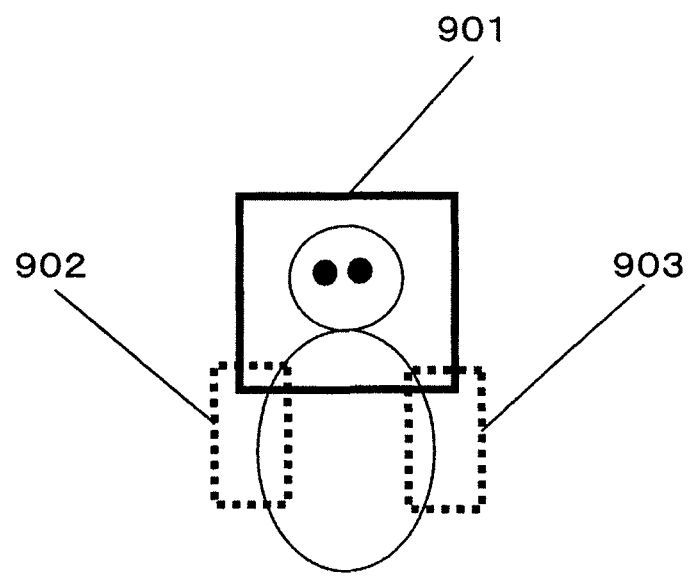
FIG. 9 is a view showing an example of the combination process of the combined detection frames in the people counting device of FIG. 1.

In the combination process of the combined detection frames of different portion detectors in the people counting unit 109, for example, when the combined detection frame 901 of the rectangular region 601 of the upper body detector (refer to FIG. 6) is in the position shown in FIG. 9, the combination process may be performed in a case in which the center position of the combined detection frame of the rectangular region 603 of the left-side body detector is within the dotted line rectangle 902 or the center position of the combined detection frame of the rectangular region 602 of the right-side body detector is within the dotted line rectangle 903. This combination process may be defined in the same manner, even in a case in which the combined detection frame which is the standard is not the rectangular region 601 of the upper body detector.

The display unit 110 displays the number of people counted, which is output from the people counting unit 109, to the user.

Next, the operation of the people counting device 1 of the present embodiment will be illustrated.

Figure 10:
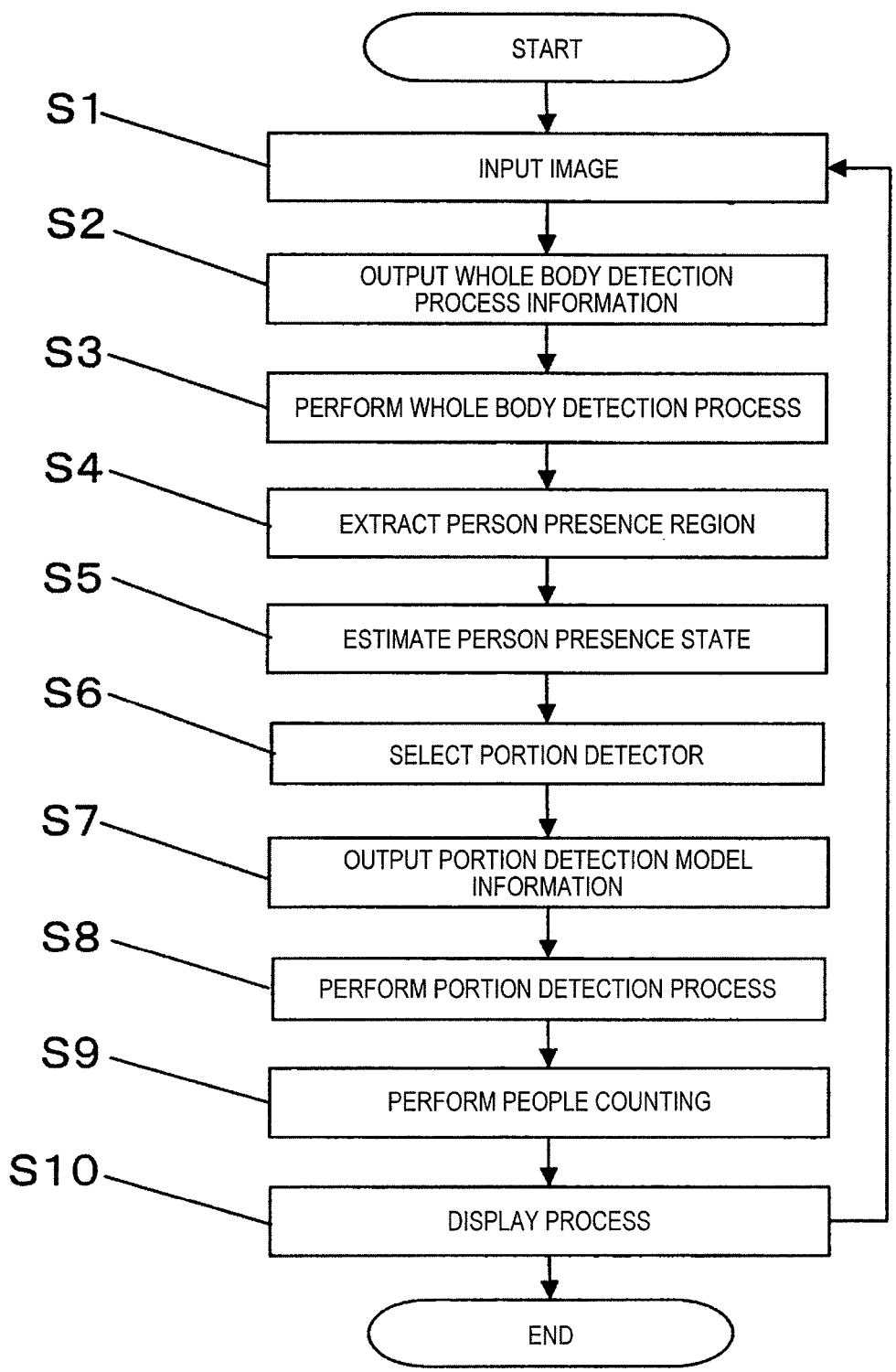
FIG. 10 is a flowchart to illustrate the operation of the people counting device of FIG. 1.
Figure 11:
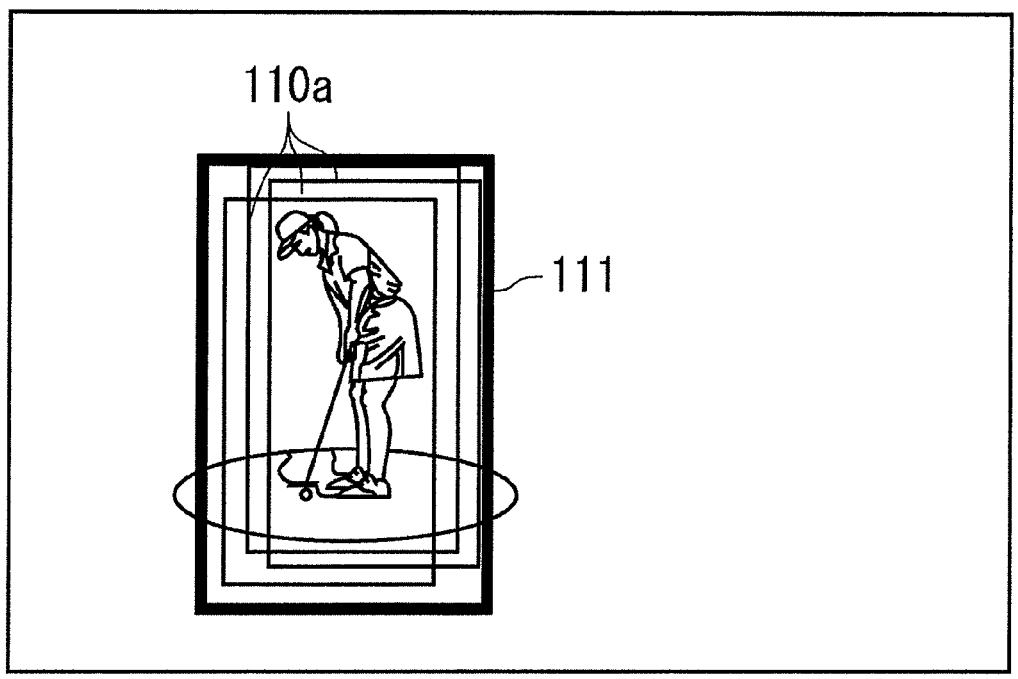
FIG. 11 is a view showing the person detection candidate rectangular frames in the person detection technology of the related art.
Figure 12A:
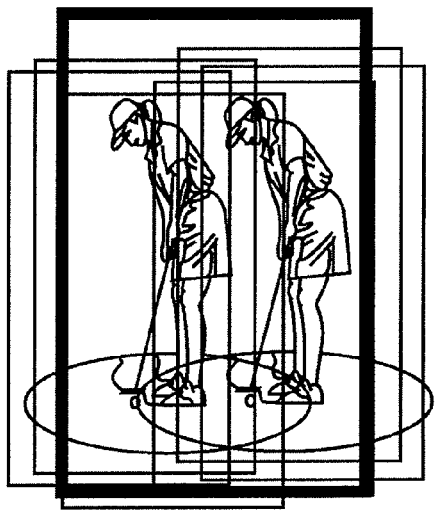
FIGS. 12(a) and 12(b) are views to illustrate the problems of the person detection technology of the related art.
Figure 12B:
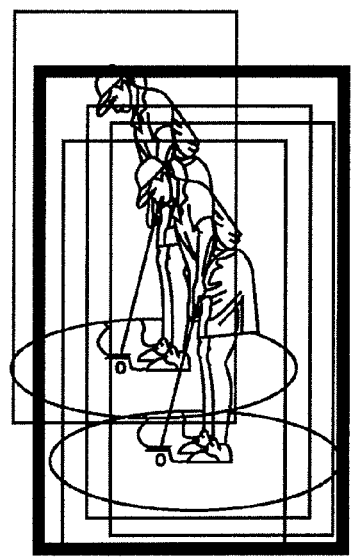
Figure 13:
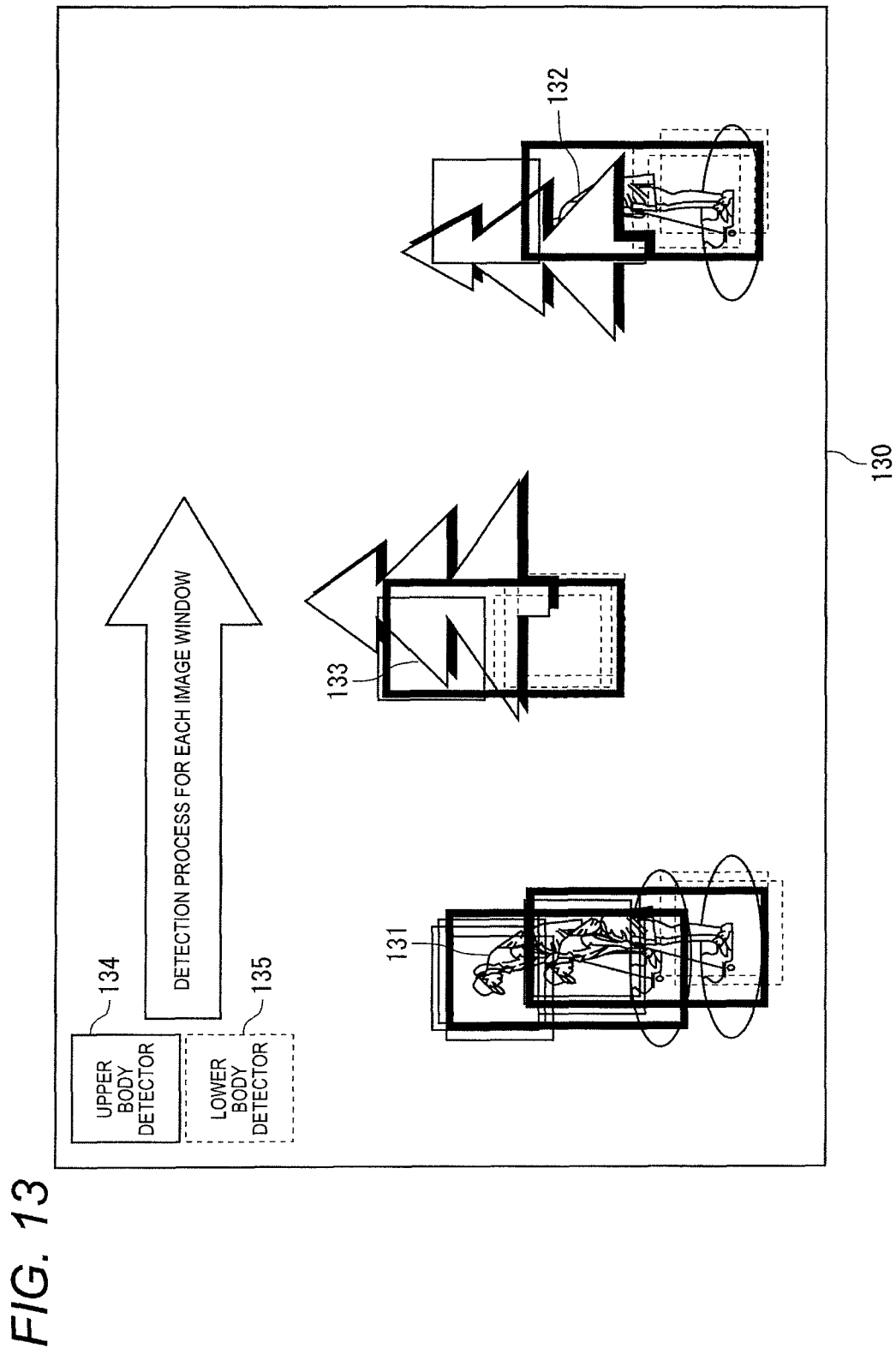
FIG. 13 is a view to illustrate the problems of the person detection technology of the related art.

FIG. 10 is a flow chart to illustrate the operation of the people counting device 1 of the present embodiment. In FIG. 10, first, the input and output of the image information imaged from the surveillance camera or the like is performed by the image input unit 101 (Step S1).

Next, the whole body detection model DB unit 103 sets the value of the feature value extracted from within the image window as the input, and outputs whole body detection model information, in which a score value to determine whether or not a whole body is contained within the image window is output, to the whole body detection process unit 102 (Step S2).

Next, the whole body detection process unit 102, after converting the input image into a pyramid image by repeatedly performing the scaling process of a resize process or the like in relation to the image input from the image input unit 101, extracts an image window of a predetermined size from each of the scaling images that configure the pyramid image at a predetermined interval, and performs the whole body detection process in relation to each of the image windows (Step S3). The whole body detection process is performed based on a score value which represents the likeness of a whole-body of a person within the image window, and determines that the whole body of a person is contained in the image window in which a score value is calculated to be a predetermined score threshold value A, which is set in advance, or higher. Furthermore, the whole body detection process unit 102 finally outputs two dimensional positional information obtained when performing inverse scaling conversion on the two dimensional positional information of the image window determined to contain a whole body from the respective scaling images in relation to the input image prior to being subjected to the scaling process, and the score value of the image window.

Next, the person presence region extraction unit 104, from among a plurality of whole body detection candidate frames which are the output results of the whole body detection process unit 102, classifies the whole body detection candidate frames in which the distance between the center positions is within a predetermined distance threshold value B into the same group, and for each of the groups, and sets the person presence region which is the union region of the whole body detection candidate frames (Step S4).

Next, the person presence state estimation unit 105 estimates the person presence state within the person presence region as one of the four patterns (pattern 1) one person is present, (pattern 2) persons are lined up in the vertical direction, (pattern 3) persons are lined up in the horizontal direction and (pattern 4) other, based on the threshold value determination result according to the vertical and the horizontal size information, respectively, of the person presence region output from the person presence region extraction unit 104 (Step S5).

Next, the portion detector selection unit 106 selects the portion detection process to be used in the following process according to the four patterns estimated by the person presence state estimation unit 105 (Step S6).

Next, the portion detection model DB unit 108 is selected by the portion detector selection unit 106, sets the value of the feature value extracted from the image window as the input, and outputs portion detection model information, in which a score value to determine whether or not a portion of a person is contained within the image window is output, to the portion detection process unit 107 (Step S7).

Next, the portion detection process unit 107 sets the person presence region extracted by the person presence region extraction unit 104 as the input, and converts the input image into a pyramid image by repeatedly performing a scaling process of a resize process or the like in relation to the input image. Subsequently, in the same manner as the whole body detection process unit 102, an image window of a predetermined size is extracted from each of the scaling images in the pyramid image at a predetermined interval, and the portion detection process is performed by using the portion detector information output from the portion detector selection unit 106 in relation to each of the image windows (Step S8). The portion detection process is performed based on a score value which represents the likeness of a portion of a person within the image window, and determines that the portion of a person is contained in the image window in which a score value is calculated to be a predetermined score threshold value F, which is set in advance, or higher. Furthermore, the portion detection process unit 107 finally outputs two dimensional positional information obtained when performing inverse scaling conversion on the two dimensional positional information of the image window determined to contain a portion of a person from the respective scaling images in relation to the input image prior to being subjected to the scaling process, and the score value of the image window.

Next, the people counting unit 109 counts the number of people detected according to the four patterns selected by the portion detector selection unit 106 (Step S9). For example, (1) in a case in which there is one person present, using the two dimensional positional information of the plurality of image windows determined to contain the whole body of a person and the score value of the respective image windows, the number of combined detection frames obtained by performing the combination process on the detection frame candidates is counted as the detected number of people. In addition, (2) in a case in which persons are lined up vertically, using the two dimensional positional information of the plurality of image windows determined to contain the upper body of a person and the score value of the respective image windows, the number of combined detection frames obtained by performing the combination process on the detection frame candidates is counted as the detected number of people. In addition, (3) in a case in which persons are lined up horizontally, using the two dimensional positional information of the plurality of image windows determined to contain a half of a body of a person and the score value of the respective image windows, the result of further performing combination of the combined detection frames in relation to the combined detection frames subjected to the combination process of the detection frame candidates by further using the respective detectors of the right-side body and the left-side body is counted as the number of people. In addition, (4) in other cases, using the two dimensional positional information of the plurality of image windows determined to contain an upper body and a half of a body of a person and the score value of the respective image windows, the result of further performing combination of the combined detection frames in relation to the combined detection frames subjected to the combination process of the detection frame candidates by further using the respective detectors of the upper body, the right-side body and the left-side body is counted as the number of people.

Next, the display unit 110 displays the number of people counted, which is output from the people counting unit 109, to the user (Step S10).

In this manner, according to the people counting device 1 of the present embodiment, since the people counting device 1 includes the whole body detection process unit 102, the person presence region extraction unit 104, the person presence state estimation unit 105 and the portion detector selection unit 106, it is possible to estimate the person presence state from the shape of the presence region after extracting the person presence region, and furthermore, from the estimation results, it is possible to perform an optimal portion detection process in relation to the person presence region in order to perform people counting on persons being close to one another and persons with occlusion. Accordingly, it is possible to perform a people counting process which is faster, has less erroneous detections and has higher precision than a method of the related art in which a portion detector is used for the entire input image.

Furthermore, the feature values extracted by the whole body detection process unit 102 and the portion detection process unit 107 are not limited to the HOG feature value, the Edgelet feature value or the like which are generally used for whole body detection of a person and portion detection of a portion of a person.

In addition, the person presence region 303 in the person presence region extraction unit 104, in addition to being set using the calculation of the union region as shown in FIG. 3, for example, as an example of a countermeasure to noise rectangles (rectangles in which the distance between the center positions is within the predetermined distance threshold value B, however, are clearly in a deviated position that would have a bad influence on the setting of the union region), may adopt a method in which the result of calculating the average center position and the average size of all of the whole body detection candidate frames 204 where the distance between the center positions is within a predetermined distance threshold value B is set as the person presence region 303.

In addition, the size setting of the reference image window group 401 in the person presence state estimation unit 105 may be set automatically using calibration of the surveillance camera or the like, and may also be set manually while the user views the image that is actually imaged.

In addition, in the whole body detection process unit 102 and the portion detection process unit 107, since the sizes on the input image of the whole body, the upper body and a half of a body which may be detected at an arbitrary position on the input image can be estimated by using the size information of the reference image window group 401 set in the person presence state estimation unit 105, the scaling parameters (the number of times the scaling is performed and the scaling steps) when converting the input image into a pyramid image may be optimized.

In addition, a plurality of items of model information to detect the whole body of a person, for example, separated by direction such as front facing, rear facing, right facing, left facing, oblique front right facing, oblique front left facing, oblique rear right facing and oblique rear left facing, or separated by head-wearable items such as hats and helmets, various items of attribute information such as clothing such as skirts and accessories such as bags, may be accumulated within the whole body detection model DB unit 103, and the same is true in relation to within the portion detection model DB unit 108.

In addition, for the combination process of the detection candidate frame groups 701, 801, 802 and 803 in the people counting unit 109, a combination process method may be used in which the threshold value determination using the score threshold value is not considered, and only the threshold value determination using the distance threshold value of each of the center positions of the detection candidate frame groups 701, 801, 802 and 803 is considered.

Furthermore, for the combination process of the detection candidate frame groups 701, 801, 802 and 803 in the people counting unit 109, in addition to the score values representing the likeness of an upper body and a half body of a person being contained within each of the detection candidate frame groups 701, 801, 802 and 803, a method may be used, which is the combination process of the detection candidate frame groups, which improves the grouping precision by adding a three dimensional object score value in which the likeness of a three dimensional object being contained within each of the detection candidate frame groups 701, 801, 802 and 803 is calculated by using depth information on the input image measured using a stereo camera or the like, and a trace score value which represents the degree of matching between the detection candidate frame groups 701, 801, 802 and 803 in the input images of the present and the respective trace results from the frames of the past by applying tracing technology using template matching or the like in relation to a template position of the final combined detection frame in the input images of the past.

In addition, in relation to the combination process of the combined detection frames of different portion detectors in the people counting unit 109, for example, as in FIG. 9, when the combined detection frame 901 of the rectangular region 601 of the upper body detector, which is to be the standard, is in the position shown in FIG. 9, the positions of the dotted line rectangles 902 and 903 may be set manually by the user in advance, and may also be set statistically from a large number of detection target samples (images in which the whole body of a person is contained).

In addition, in relation to the combination process of the combined detection frames of different portion detectors in the people counting unit 109, a method may be used in which the output results of each of the portion detectors are combined into one by performing maximum a posteriori probability estimation, as in Non-Patent Document 2.

The present invention is described in detail with reference to a specific mode of embodiment, however, it is obvious to a person skilled in the art that it is possible to add various modifications and changes without departing from the range of the spirit of the present invention.

The present invention is made based on the Japanese Patent Application No. 2010-258037 filed on Nov. 18, 2010, the content of which is incorporated herein by reference.

INDUSTRIAL APPLICABILITY

The present invention has effects such as being able to perform person detection with more precision and speed, even in a case in which, in the input image, a plurality of persons are close to one another or occlusion occurs due to a plurality of persons, and the present invention can be applied to a surveillance camera system.

DESCRIPTION OF REFERENCE SIGNS 1 people counting device
101 image input unit 102 whole body detection process unit
103 whole body detection model database unit
104 person presence region extraction unit
105 person presence state estimation unit
106 portion detector selection unit
107 portion detection process unit
108 portion detection model database unit
109 people counting unit
110 display unit
201 input image
202 pyramid image
203 image window
204 whole body detection candidate frame
205, 303, 402 person presence region
301, 302 whole body detection candidate frame
401 reference image window group
403 center position
404, 501 rectangle
601 rectangular region of upper body detector
602 rectangular region of right-side body detector
603 rectangular region of left-side body detector
701, 801-803 detection candidate frame group
702, 804-806 combined detection frame
807 union region
809 person
901 combined detection frame
902, 903 dotted line rectangle

The invention claimed is:

1. A people counting device comprising:
a person presence region extractor which extracts a region in which a person is present by performing person detection in relation to an input image;
a person presence state estimator which estimates a person presence state from an extraction result of the person presence region extractor, the person presence state estimator estimates a direction in which persons are overlapping based upon the extraction result of the person presence region extractor;
a portion detector selector which selects a type of portion detector to be used for people count measurement based on an estimation result of the person presence state estimator, and outputs portion detector information;
a portion detection processor which performs a portion detection process for detecting a portion of a person based on the portion detector information output from the portion detector selector; and
a people counter which obtains a number of people within the input image from a portion detection process result of the portion detection processor.

2. The people counting device according to claim 1, wherein the portion detector selector selects at least one of an upper body detector, a lower body detector, a right-side body detector and a left-side body detector as the portion detector.

3. The people counting device according to claim 2, wherein the person presence state estimator determines that the persons are overlapping with one another in a vertical direction when rectangle information extracted by the person presence region extractor is long in the vertical direction and not in the horizontal direction, in comparison with a size of a person, and
wherein the portion detector selector selects the upper body detector when the person presence state estimator determines that the persons are overlapping with one another in the vertical direction.

4. The people counting device according to claim 2, wherein the person presence state estimator determines that the persons are overlapping with one another in the horizontal direction when rectangle information extracted by the person presence region extractor is long in the horizontal direction and not in the vertical direction, in comparison with the size of a person, and
wherein the portion detector selector selects the right-side body detector and the left-side body detector when the person presence state estimator determines that the persons are overlapping with one another in the horizontal direction.

5. The people counting device according to claim 2, wherein the person presence state estimation estimator determines that the persons are overlapping one another over a wide range when rectangle information extracted by the person presence region extractor is long in the horizontal direction and in the vertical direction, in comparison with the size of a person, and
wherein the portion detector selector selects the upper body detector, the lower body detector, the right-side body detector and the left-side body detector when the person presence state estimator determines that the persons are overlapping with one another over a wide range.

6. A people counting method comprising:
extracting a region in which a person is present by performing person detection in relation to an input image;
estimating a person presence state from a result in which a region where a person is present is extracted, the estimating estimates a direction in which persons are overlapping based upon the extraction result of the extracting;
selecting a type of portion detector to be used for people count measurement based on a result in which a person presence state is estimated, and outputting portion detector information;
performing, by a processor, a portion detection process for detecting a portion of a person based on the portion detector information of the selected portion detector; and
obtaining a number of people within the input image from a result of the detection process.

7. A non-transitory computer readable storage medium storing a people counting program, the people counting program comprising instructions, which, when executed by a computer, cause the computer to:
extract a region in which a person is present by performing person detection in relation to an input image;
estimate a person presence state from a result in which a region where a person is present is extracted, by estimating a direction in which persons are overlapping based upon the extraction result of the extracting a region;
select a type of portion detector to be used for people count measurement based on a result in which a person presence state is estimated, and outputting portion detector information;
perform a portion detection process for detecting a portion of a person based on the portion detector information of the selected portion detector; and
obtain a number of people within the input image from a result of the detection process.

8. The people counting method according to claim 6, wherein the selecting selects at least one of an upper body detector, a lower body detector, a right-side body detector and a left-side body detector as the portion detector.

9. The people counting method according to claim 8,
wherein the estimating a person presence state determines that the persons are overlapping with one another in a vertical direction when rectangle information extracted by the extracting is long in the vertical direction and not in the horizontal direction, in comparison with a size of a person, and
wherein the selecting a type of a portion detector selects the upper body detector when the estimating a person presence state determines that the persons are overlapping with one another in the vertical direction.

10. The people counting method according to claim 8,
wherein the estimating a person presence state determines that the persons are overlapping with one another in the horizontal direction when rectangle information extracted by the person extracting is long in the horizontal direction and not in the vertical direction, in comparison with the size of a person, and
wherein the selecting a type of a portion detector selects the right-side body detector and the left-side body detector when the estimating a person presence state determines that the persons are overlapping with one another in the horizontal direction.

11. The people counting method according to claim 8,
wherein the estimating a person presence state determines that the persons are overlapping one another over a wide range when rectangle information extracted by the person extracting is long in the horizontal direction and in the vertical direction, in comparison with the size of a person, and
wherein the selecting a type of a portion detector selects the upper body detector, the lower body detector, the right-side body detector and the left-side body detector when the estimating a person presence state determines that the persons are overlapping with one another over a wide range.

12. The non-transitory computer readable storage medium according to claim 7,
wherein the selecting of a portion detector type selects at least one of an upper body detector, a lower body detector, a right-side body detector and a left-side body detector as the portion detector.

13. The non-transitory computer readable storage medium according to claim 12,
wherein the estimate of a person presence state determines that the persons are overlapping with one another in a vertical direction when rectangle information extracted is long in the vertical direction and not in the horizontal direction, in comparison with a size of a person, and
wherein the selecting a type of a portion detector selects the upper body detector when the person presence state estimate determines that the persons are overlapping with one another in the vertical direction.

14. The non-transitory computer readable storage medium according to claim 12,
wherein the estimate of a person presence state determines that the persons are overlapping with one another in the horizontal direction when rectangle information extracted is long in the horizontal direction and not in the vertical direction, in comparison with the size of a person, and
wherein the selecting a type of a portion detector selects the right-side body detector and the left-side body detector when the person presence state estimate determines that the persons are overlapping with one another in the horizontal direction.

15. The non-transitory computer readable storage medium according to claim 12,
wherein the estimate of a person presence state determines that the persons are overlapping one another over a wide range when rectangle information extracted is long in the horizontal direction and in the vertical direction, in comparison with the size of a person, and
wherein the selecting a type of a portion detector selects the upper body detector, the lower body detector, the right-side body detector and the left-side body detector when the person presence state estimate determines that the persons are overlapping with one another over a wide range.

16. The people counting device according to claim 1,
wherein the portion detector selector selects at least two of an upper body detector, a lower body detector, a right-side body detector and a left-side body detector as the portion detector.

17. The people counting method according to claim 6,
wherein the selecting selects at least two of an upper body detector, a lower body detector, a right-side body detector and a left-side body detector as the portion detector.

18. The non-transitory computer readable storage medium according to claim 7,
wherein the selecting of a portion detector type selects at least two of an upper body detector, a lower body detector, a right-side body detector and a left-side body detector as the portion detector.

* * * * *